F. B. CARLISLE.
FRICTION TAPE FABRIC AND METHOD OF PRODUCING THE SAME.
APPLICATION FILED JUNE 3, 1921.
1,402,918. Patented Jan. 10, 1922.
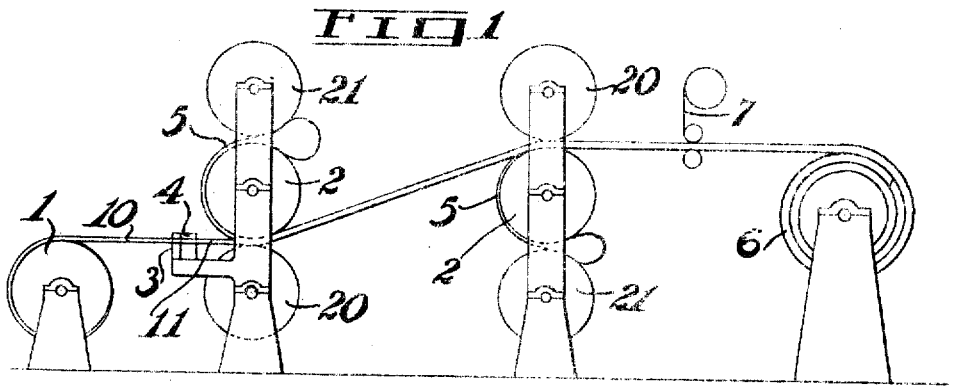
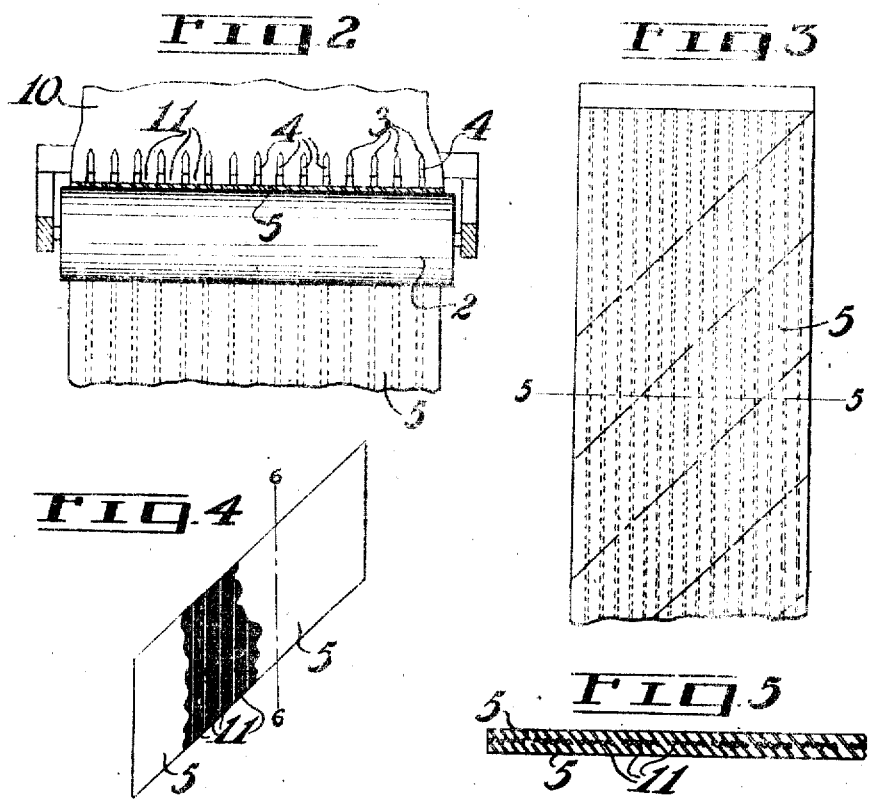
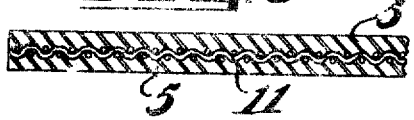
Inventor
Fred B. Carlisle
By H.L. & C.L. Reynolds.
Attorneys

UNITED STATES PATENT OFFICE.

FRED B. CARLISLE, OF SEATTLE, WASHINGTON.

FRICTION TAPE FABRIC AND METHOD OF PRODUCING THE SAME.

1,402,918.     Specification of Letters Patent.     Patented Jan. 10, 1922.

Application filed June 3, 1921. Serial No. 474,832.

*To all whom it may concern:*

Be it known that I, FRED B. CARLISLE, a citizen of the United States of America, and resident of the city of Seattle, in the county of King and State of Washington, have invented certain new and useful Improvements in Friction-Tape Fabrics and Methods of Producing the Same, of which the following is a specification.

My invention relates to a process for producing friction tape fabric for use in building tires, and to the resulting product.

An object of my invention is to produce a homogeneous friction fabric in which the woven fabric is disposed in tapes separated by rubber.

Another object is to produce a process by means of which such friction tape fabric may be produced by employing either a broad strip of cotton fabric or a series of narrower tapes.

Another object is to produce a process by means of which such friction tape fabric may be cheaply produced by common apparatus with but slight alterations.

Another object is to produce a process whereby friction tape fabric may be produced in lengths for manufacturing tires therefrom, in which tapes of fabric are imbedded so that the original weft threads have been cut into relatively short lengths and the warp threads run uninterrupted and diagonally about the axis of the tire core.

My invention comprises those novel steps and the series thereof which are described in the specification and particularly defined by the claims terminating the same, and the product illustrated, described, and claimed herein.

In the accompanying drawings I have diagrammatically illustrated apparatus for carrying out the various steps in my process, and also the product resulting therefrom and forming a part of my invention.

Figure 1 is an elevation of two sets of calender rolls, arranged for depositing rubber upon the tapes, and showing diagrammatically, in connection therewith, apparatus for carrying out my process.

Figure 2 is a plan view of a portion of the same apparatus.

Figure 3 is a plan view of the friction tape fabric produced by my process.

Figure 4 is an elevation, with parts broken away, of a single strip of friction tape fabric for use in building an individual tire.

Figure 5 is a section on the line 5—5 of Figure 3 and Figure 6 is a section on the line 6—6 of Figure 4, both being shown on an enlarged scale.

According to my process, a plurality of woven tapes laid parallel and in the same plane are coated on one side with rubber so as to form of the various independent tapes a homogeneous sheet of friction tape fabric. The tapes might be independent at the outset of the process or, as I prefer to carry out the process, a broad strip of woven cotton fabric is divided longitudinally and the tapes so formed are again joined by the application of the rubber.

The apparatus shown in Figures 1 and 2 is illustrative of apparatus which might be employed in carrying out the process. The woven cotton fabric is wound originally upon a large reel 1. Thence it passes between calender rolls 2 and 20. A third calender roll 21 is employed, rubber being supplied between the rolls 21 and 2 so that it will be deposited upon the friction cloth as it passes between the rolls 2 and 20. This is the usual method of manufacturing friction fabric. However, intermediate the reel 1 and the calender rolls 2 and 20 I provide a plurality of rippers or knives 3, spaced transversely of the direction of movement of the cotton fabric 10. These knives may be brought into play after the cotton fabric has been started between the rolls 2 and 20, and they divide the fabric 10 into a series of parallel tapes. It will be understood that maintaining the sheet 10 stationary and moving the splitting knives 3 thereover would be only a reversal of the method described above.

I prefer that these tapes be separated transversely of the plane of the fabric sheet, and therefore between the knives 3 and rolls 2 and 20 I provide spacers 4. The knives 3 and spacers 4 might conveniently be joined in the commercial apparatus, and are so illustrated. The cotton fabric 10 should be of less width than the calender rolls 2 or 20 so that the strips 11 of the fabric may be separated by a small amount and yet the ultimate outer edges of the strip will not lie outside of the calender rolls.

After the cotton fabric has been split into tapes and separated, a coating of rubber 5 is applied thereto by passing the tapes through the calender rolls. This coating lies upon the upper surface of the tapes and fills the interstices therebetween. The friction fabric so formed may then be passed between other similar calender rolls where rubber is applied to the under side thereof. It may then be wound upon a reel 6, a protecting fabric 7 being applied to one side thereof after the finished friction tape fabric has passed from the last calender rolls. The steps after the tapes have been joined by the applied rubber into a homogeneous sheet are to a large extent immaterial.

It it immaterial whether or not the woven fabric has been coated with the rubber upon one or both sides previous to forming the tapes therefrom. If it has been so coated, the tapes may nevertheless be cut to sever the weft threads of the woven fabric, and then rejoined by a coating of rubber as described. The manner in which the weft threads are separated is likewise immaterial; they may be cut by knives, ripped or torn, or severed in any manner found suitable or desirable. Likewise, the width of the tapes may vary, and for different sizes of tires would vary. The objects to keep in view, in determining the width of tapes to employ in making a friction tape fabric for a given tire, are that the tapes must not have their tensile strength reduced below that required of them in the tire (this being an easy matter to determine), and that the width of the tape must not be so small that each individually is not resistant to puncture.

The product formed by the process described above, in its original state consists of a wide strip of friction tape fabric wherein a series of narrow tapes 11 are imbedded between layers of rubber and wherein the interstices between the edges of the tapes are also filled with rubber. This would then be generally cut on the bias to form individual strips for making tires. In these individual strips the warp threads extend on the bias, and consequently in a tire would extend diagonally about the axis of the tire core. The weft threads remain in the fabric and add particularly to its tensile strength and to its ability to resist puncture, but they are cut into short lengths. They serve to bind the warp threads together until the first coating of rubber has been applied thereto, and they serve in the finished tire to add strength to these warp threads.

Owing to the separation between adjacent edges of the strips 11, the central part of the individual tire strips may be stretched lengthwise while its edges may be compressed as the tire is stitched down about the core. A tire formed of such strips combines the advantages both of a cord tire in its flexibility and ease of construction and in strength, and includes also the tensile strength and toughness of a fabric tire.

What I claim as my invention is:

1. A process of producing friction tape fabric which consists in dividing a strip of fabric into a plurality of tapes, and in then applying rubber thereupon to form a homogeneous sheet.

2. A process of producing friction tape fabric which consists in dividing a moving strip of fabric in the direction of movement into a plurality of tapes, and in then applying rubber thereupon to form a homogeneous sheet.

3. A process of producing friction tape fabric which consists in dividing a moving strip of fabric in the direction of movement into a plurality of tapes, in separating the edges of adjacent tapes, and in then applying rubber thereupon and therebetween to form a homogeneous sheet.

4. A process of producing friction tape fabric which consists in cutting a moving strip of fabric in the direction of movement into a plurality of tapes, in separating the adjacent edges of the various tapes transversely of the plane of movement, and in then applying rubber thereupon and therebetween to form a homogeneous sheet.

5. The process of producing a strip of friction tape fabric for use in tire manufacture which consists in severing the weft threads only of a strip of fabric, in applying rubber to the tapes so formed, and in then cutting the homogeneous sheet so formed to sever the warp threads of the fabric on the bias.

6. A homogeneous sheet of friction tape fabric comprising a plurality of woven tapes having continuous warp threads and weft threads severed along the tape edges, and all of said tapes coated with friction rubber.

7. A sheet of friction tape fabric for use in the manufacture of an individual tire comprising a plurality of woven tapes having continuous warp threads extending from edge to edge diagonally across the sheet, and coated with rubber to form a homogeneous sheet.

8. A sheet of friction tape fabric for use in the manufacture of an individual tire comprising a plurality of woven tapes having continuous warp threads extending from edge to edge diagonally across the sheet, and coated with rubber, to form a homogeneous sheet, the weft threads in said tapes being severed along the edges of the tapes.

Signed at Seattle, King County, Washington, this 27th day of May, 1921.

FRED B. CARLISLE.